(12) United States Patent
Sun et al.

(10) Patent No.: US 8,217,597 B2
(45) Date of Patent: Jul. 10, 2012

(54) DRIVE CIRCUIT FOR A CAPACITIVE LOAD

(75) Inventors: Chi Ping Sun, Hong Kong (CN); Jian Qun Wu, Shenzhen (CN); Hai Bo Jiang, Shenzhen (CN); Jian Han, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 365 days.

(21) Appl. No.: 12/548,785

(22) Filed: Aug. 27, 2009

(65) Prior Publication Data

US 2010/0052579 A1 Mar. 4, 2010

(30) Foreign Application Priority Data

Aug. 27, 2008 (CN) .......................... 2008 1 0142107

(51) Int. Cl.
*H01L 41/04* (2006.01)
(52) U.S. Cl. ........ 318/116; 318/807; 318/808; 318/809; 318/810; 318/811
(58) Field of Classification Search .................. 318/116, 318/807–812
See application file for complete search history.

(56) References Cited

U.S. PATENT DOCUMENTS

| | | | | |
|---|---|---|---|---|
| 3,881,141 A | * | 4/1975 | Narita | 318/87 |
| 4,112,395 A | * | 9/1978 | Seward | 333/17.3 |
| 5,644,199 A | * | 7/1997 | Nojima et al. | 318/114 |
| 6,559,689 B1 | * | 5/2003 | Clark | 327/97 |
| 6,747,391 B1 | * | 6/2004 | Ben-Yaakov | 310/316.01 |
| 7,714,624 B2 | * | 5/2010 | Takasu et al. | 327/110 |

* cited by examiner

*Primary Examiner* — Walter Benson
*Assistant Examiner* — David Luo
(74) *Attorney, Agent, or Firm* — Muncy, Geissler, Olds & Lowe, PLLC

(57) ABSTRACT

A drive circuit comprising: a direct current power source; a control unit for supplying control signals; a power switch topology comprising a first switch and a second switch each having an input terminal, an output terminal, and a control terminal, the input terminals being respectively connected to the power source, the control terminals being connected to the control unit for receiving the control signals there from, the output terminals being connected to a node; and an inductance connected with a capacitive load in series between the node and the power source, wherein the control signals control the switches to alternately conduct to thereby cause the node to output a pulse signal.

10 Claims, 3 Drawing Sheets

US 8,217,597 B2

DRIVE CIRCUIT FOR A CAPACITIVE LOAD

CROSS REFERENCE TO RELATED APPLICATIONS

This non-provisional patent application claims priority under 35 U.S.C. §119(a) from Patent Application No. 200810142107.4 filed in The People's Republic of China on Aug. 27, 2008.

FIELD OF THE INVENTION

This invention relates to a drive circuit and in particular, to a drive circuit for a capacitive load, such as a piezoelectric motor and the like.

BACKGROUND OF THE INVENTION

A known type of piezoelectric motor comprises a slab of piezoelectric material having a common electrode on one surface and two discrete electrodes on the opposite surface. When the common electrode conducts with one of the discrete electrodes the piezoelectric motor moves in one direction. When the common electrode conducts with the other discrete electrode the piezoelectric motor moves in the opposite direction.

FIG. 6 shows a prior art drive circuit connected between the common electrode and one of the discrete electrodes of a piezoelectric motor. The drive circuit comprises a direct current power source DC, two half bridge circuits HB1,HB2, an inductance L and a piezoelectric motor M connected in series. Each half bridge circuit comprises two switches controlled by PWM signals. In one half cycle switches S1 and S4 are controlled to conduct while switches S2 and S3 are controlled to non-conduct and current passes through the piezoelectric motor M in a direction from node n1 to node n2. In the other half cycle switch S1 and S4 are controlled to non-conduct and switches S2 and S3 are controlled to conduct and current passes through the piezoelectric motor M in a direction from node n2 to node n1. The piezoelectric motor M is capable of moving in one direction when alternating current passes there through.

However, the above known drive circuit requires two half bridge circuits each consisting of two switches corresponding to movement of the motor in one direction only. At least one additional half bridge circuit comprising two switches is needed for movement of the motor in two directions, which is expensive.

SUMMARY OF THE INVENTION

Hence there is a desire for a simplified or less expensive drive circuit for a capacitive load.

Accordingly, in one aspect thereof, the present invention provides a drive circuit comprising: a direct current power source; a control unit for supplying control signals; a power switch topology comprising a first switch and a second switch each comprising an input terminal, an output terminal, and a control terminal, the input terminals being respectively connected to the power source, the control terminals being connected to the control unit for receiving the control signals there from, the output terminals being connected to a node; and an inductance connected with a capacitive load in series between the node and the power source, wherein the control signals control the switches to alternately conduct to thereby cause the node to output a pulse signal.

Preferably, the control signals are PWM signals.

Preferably, a capacitor is connected in parallel with the capacitive load, the equivalent capacitor of the capacitive load and the capacitor match with the inductance.

Alternatively, a capacitor connected in series with the capacitive load.

Preferably, the capacitive load comprises a piezoelectric motor.

Preferably, the piezoelectric motor comprises a piezoelectric element having a common electrode and two discrete electrodes each connected in series with a switch.

Preferably, the capacitive load comprises at least two piezoelectric motors.

Preferably, the piezoelectric motors are connected in parallel and each piezoelectric motor is connected in series with a respective switch.

Preferably, each piezoelectric motor is connected in parallel with a respective capacitor, the equivalent capacitor of the piezoelectric motor and the capacitor match with the inductance.

Alternatively, the piezoelectric motors are connected in parallel with a single capacitor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. The figures are listed below.

DETAILED DESCRIPTION OF THE PREFERRED EMBODIMENTS

Figure 1:
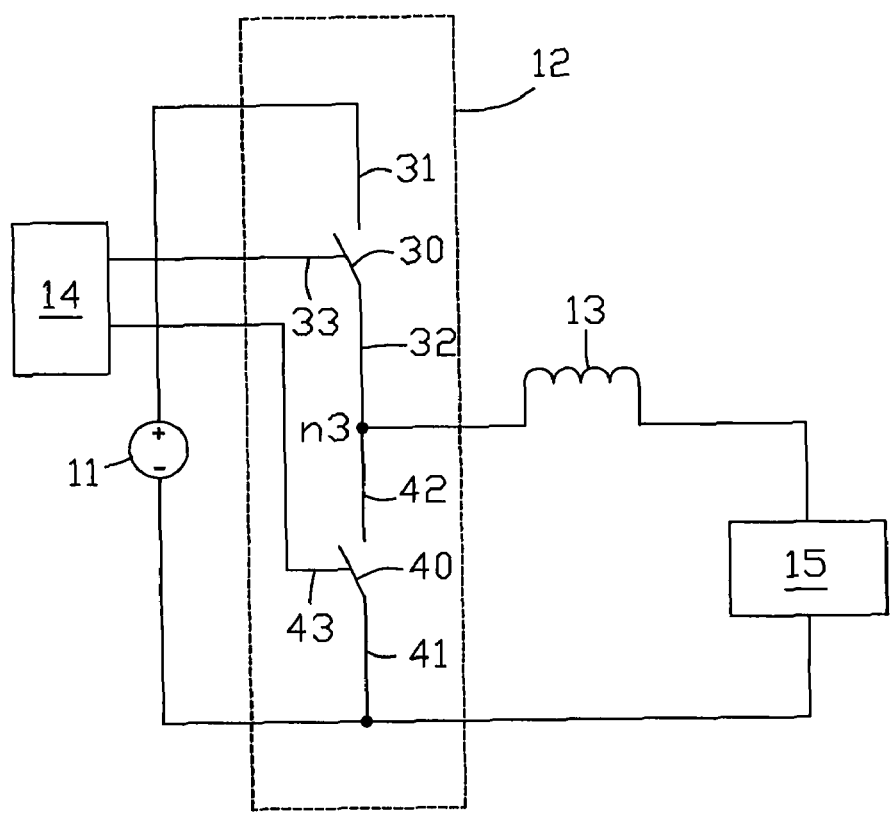
FIG. 1 is a schematic circuit diagram of a drive circuit in accordance with a first embodiment of the present invention.

A drive circuit in accordance with a first embodiment of the present invention is shown in FIG. 1. The drive circuit comprises a direct current power source 11, a power switch topology 12, an inductance 13, a control unit 14 and a capacitive load 15. The power switch topology 12 has a first switch 30 and a second switch 40. Each switch 30, 40 has an input terminal 31, 41, an output terminal 32, 42, and a control terminal 33, 43. The input terminals 31, 41 are respectively connected to two power terminals of the power source 11. The control terminals 33, 43 are connected to the control unit 14 for receiving control signals there from. The output terminals 32, 42 are connected to node n3 which is connected to one end of the inductance 13, the other end of the inductance 13 is connected to the capacitive load 15 which is further connected to one of the power terminals of the power source 11. The control unit 14 is configured to supply/provide control signals, for example PWM signals, which are sent to the control terminals 33, 43 of the switches 30, 40 to alternately conduct one of the switches 30, 40, to thereby cause the node n3 to output a pulse signal. The inductance 13 and the capacitive load 15 generate LC resonance when the pulse signal output from the node n3 passes through the inductance 13 and the capacitive load 15.

The switches 30, 40 may be transistors, metal-oxide-semiconductor field-effect transistors (MOSFETs), Insulated Gate Bipolar Transistors (IGBTs), or GTOs (Gate-Turn-Off Thyristors). The control unit 14 may be a micro-processor providing control signals according to predetermined programs.

The capacitive load 15 may be a piezoelectric motor as used, for example, in portable electronic devices with image capture function, such as mobile phones or Personal Digital Assistants, for driving a lens module thereof.

Figure 2:
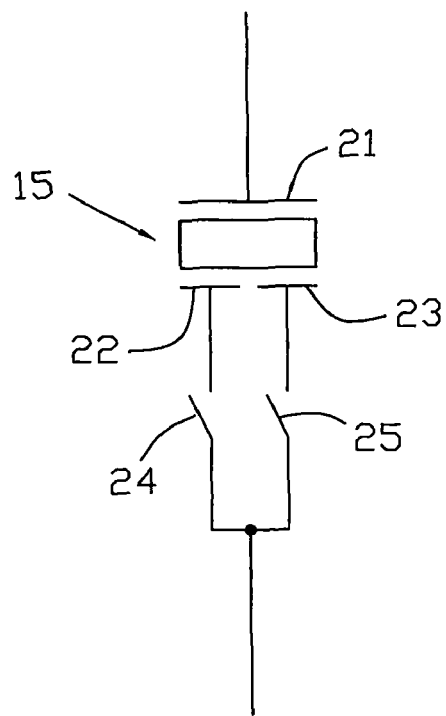
FIG. 2 shows an equivalent circuit of a piezoelectric motor.

FIG. 2 shows an equivalent schematic circuit for a piezoelectric motor. The motor may comprise a slab like a piezoelectric element which has a common electrode 21 on one surface thereof and two discrete electrodes 22, 23 on an opposite surface thereof. Two switches 24 and 25 are respectively connected in series to the discrete electrodes 22, 23 respectively and are controlled by control signals to alternately conduct to thereby select which one of the electrodes 22 and 23 conducts with the common electrode 21. When the common electrode 21 conducts with one of the discrete electrodes 22, 23 the piezoelectric motor is capable of moving in a first direction. When the common electrode 21 conducts with the other one of the discrete electrodes 22, 23 the piezoelectric motor is capable of moving in a second direction opposite to the first direction. Thus the two switches 24, 25 may be termed direction switches as they determine the direction of operation of the piezoelectric motor.

In the drive circuit of the first embodiment of the present invention, only four switches 30, 40, 24, 25 are needed to control the piezoelectric motor. Thus cost is reduced.

Figure 3:
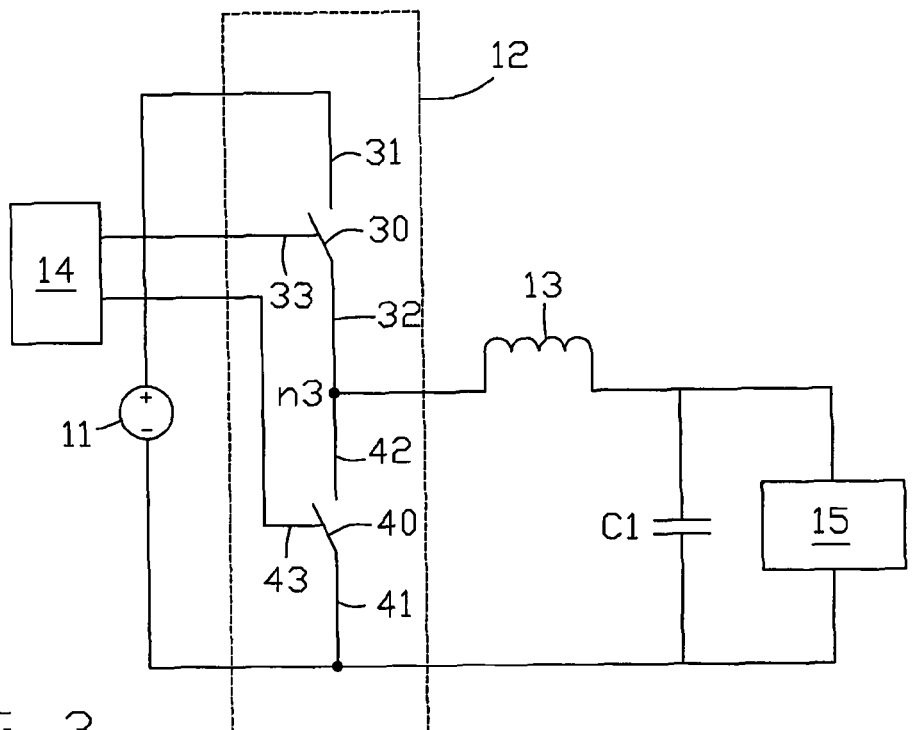
FIG. 3 is a schematic diagram of a drive circuit in accordance with a second embodiment of the present invention.

FIG. 3 shows a drive circuit in accordance with a second embodiment of the present invention. In the drive circuit of FIG. 3, a capacitor C1 is connected in parallel with the capacitive load 15. The equivalent capacitor of capacitor C1 and the capacitive load 15 matches with the inductance 13 to tune the LC resonance circuit.

Figure 4:
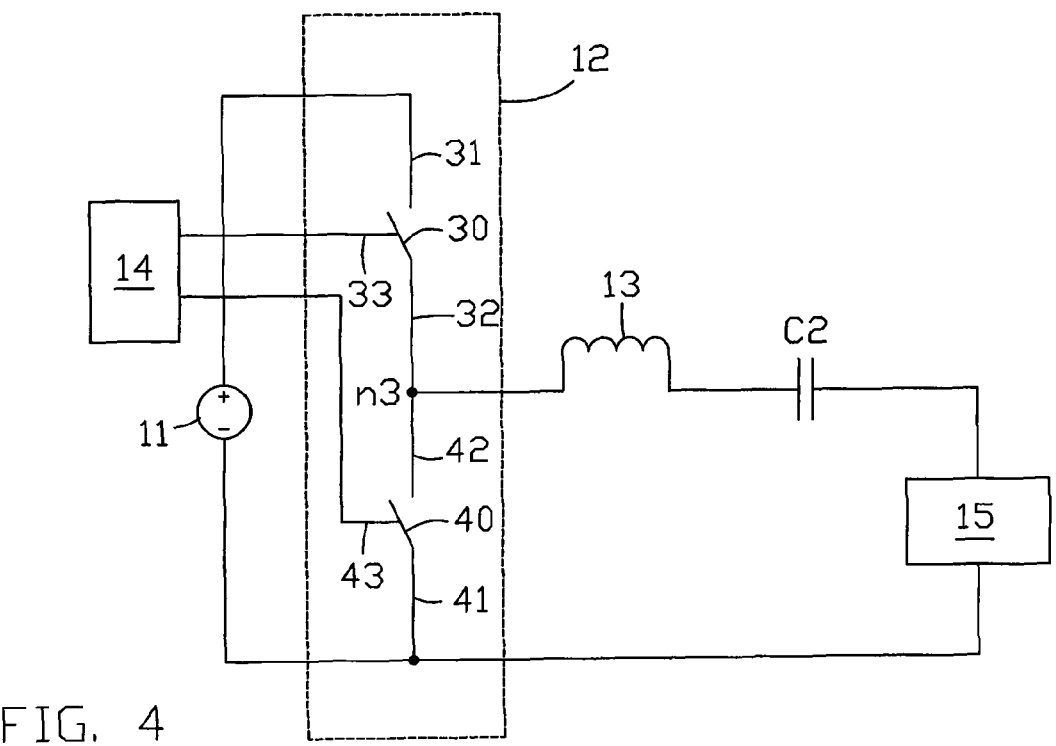
FIG. 4 is a schematic diagram of a drive circuit in accordance with a third embodiment of the present invention.

FIG. 4 shows a drive circuit in accordance with a third embodiment of the present invention. In this drive circuit, a DC blocking capacitor C2 is connected in series with the capacitive load 15 to block direct current components of the signal output from the node n3.

Figure 5:
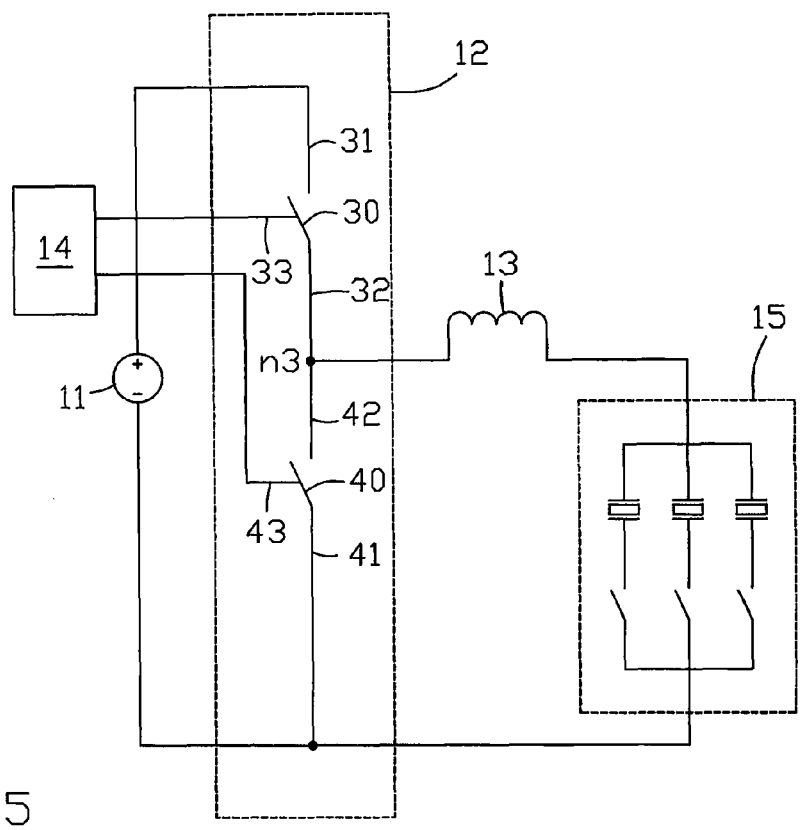
FIG. 5 is a schematic diagram of a drive circuit in accordance with a fourth embodiment of the present invention.
Figure 6:
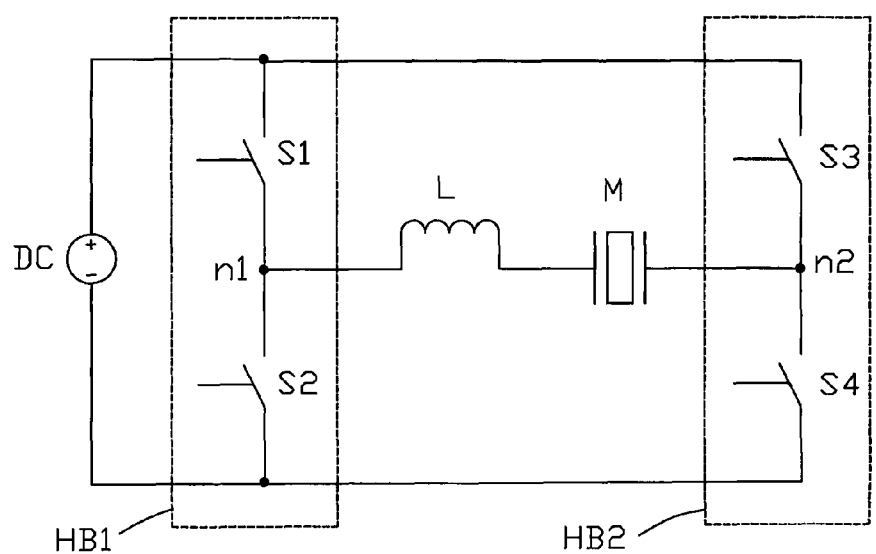
FIG. 6 shows a prior art drive circuit for a piezoelectric motor.

FIG. 5 shows a drive circuit in accordance with a fourth embodiment of the present invention. In the drive circuit in accordance with the fourth embodiment, the capacitive load 15 comprises a plurality of piezoelectric motors connected in parallel. Preferably, each piezoelectric motor is connected in series with a line switch which is used to control the piezoelectric motor to operate or not. In the drive circuit, the power switch topology 12 can be shared by the plurality of piezoelectric motors, which results in costs being further reduced. The line switches allow selective operation of individual motors while supplying a number of parallel motors with drive signals simultaneously. Preferably, each piezoelectric motor may be connected in parallel with a capacitor such that the equivalent capacitor of the piezoelectric motor and the corresponding capacitor match with the inductance to produce the LC resonance circuit. Alternatively, the piezoelectric motors may be connected in parallel with a shared capacitor if the piezoelectric motors have the same parameters.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A drive circuit comprising:
   a direct current power source;
   a control unit for supplying control signals;
   a power switch topology comprising a first switch and a second switch each comprising an input terminal, an output terminal, and a control terminal, the input terminals being respectively connected to the power source, the control terminals being connected to the control unit for receiving the control signals there from, the output terminals being connected to a node;
   an inductance connected with a capacitive load in series between the node and the power source, the capacitive load comprising a piezoelectric motor:
   wherein the control signals control the switches to alternately conduct to thereby cause the node to output a pulse signal; and
   an equivalent capacitor of the capacitive load matches with the inductance.

2. The drive circuit of claim 1, wherein the control signals are PWM signals.

3. The drive circuit of claim 1, wherein the capacitive load further comprises a capacitor connected in parallel with the piezoelectric motor, the equivalent capacitor of the piezoelectric motor and the capacitor matches with the inductance.

4. The drive circuit of claim 1, wherein the further comprises a capacitor connected in series with the piezoelectric motor.

5. The drive circuit of claim 1, wherein the piezoelectric motor comprises a piezoelectric element having a common electrode and two discrete electrodes, each discrete electrode being connected in series with a switch.

6. A drive circuit comprising:
   a direct current power source;
   a control unit for supplying control signals;
   a power switch topology comprising a first switch and a second switch each comprising an input terminal, an output terminal, and a control terminal, the input terminals being respectively connected to the power source, the control terminals being connected to the control unit for receiving the control signals there from, the output terminals being connected to a node; and
   an inductance connected with a capacitive load in series between the node and the power source, the capacitive load comprising at least two branches connected in parallel, each branch comprising a piezoelectric motor;
   wherein the control signals control the switches to alternately conduct to thereby cause the node to output a pulse signal; and
   an equivalent capacitor of each branch matches with the inductance.

7. The drive circuit of claim 6, wherein each piezoelectric motor comprises a piezoelectric element having a common electrode and two discrete electrodes, each discrete electrode being connected in series with a switch.

8. The drive circuit of claim 6, wherein each piezoelectric motor is connected in series with a respective line switch.

9. The drive circuit of claim 8, wherein each piezoelectric motor is connected in parallel with a respective capacitor, the equivalent capacitor of the piezoelectric motor and the capacitor matches with the inductance.

10. The drive circuit of claim 8, wherein the piezoelectric motors are connected in parallel with a single capacitor.

* * * * *